United States Patent
Brennan et al.

[11] Patent Number: 5,081,768
[45] Date of Patent: Jan. 21, 1992

[54] PIPE CUTTING

[75] Inventors: Matthew T. Brennan, Wayland; James A. Moruzzi, Millis, both of Mass.

[73] Assignee: SMA Controls, Inc., Medfield, Mass.

[21] Appl. No.: 644,094

[22] Filed: Jan. 22, 1991

[51] Int. Cl.[5] .................. B26D 3/16; B23D 21/00; B23D 21/04

[52] U.S. Cl. .................................. 30/101; 30/96; 30/97

[58] Field of Search .............. 30/91, 92, 93, 94, 101, 30/276, 347, 97, 96

[56] References Cited

U.S. PATENT DOCUMENTS

| | | |
|---|---|---|
| 1,766,323 | 6/1930 | Bennett . |
| 2,807,921 | 10/1957 | Dewing . |
| 2,842,238 | 7/1958 | Shaw . |
| 3,704,516 | 12/1972 | Ono ........................... 30/96 |
| 4,402,136 | 9/1983 | Rast .......................... 30/101 |
| 4,418,591 | 12/1983 | Astle ......................... 30/97 |
| 4,493,150 | 1/1985 | Garcia et al. ............... 30/97 |
| 4,625,464 | 12/1986 | Kubo ......................... 30/92 |
| 4,682,919 | 7/1987 | Mitchell ..................... 30/97 |
| 4,689,883 | 9/1987 | Dent . |
| 4,739,688 | 4/1988 | Brennan . |
| 4,830,551 | 5/1989 | Brennan . |
| 4,872,249 | 10/1989 | VanderPol . |
| 4,939,964 | 7/1990 | Ricci ......................... 30/97 |

Primary Examiner—Douglas D. Watts
Assistant Examiner—Paul M. Heyrañasr
Attorney, Agent, or Firm—Fish & Richardson

[57] ABSTRACT

A pipe cutting system includes an annular pipe encircling band member with parallel edge surfaces for encircling the pipe to be cut, releasable structure for securing the band member in pipe encircling configuration, and structure for spacing the edge surfaces of the band from the outer surface of the pipe. A carriage assembly includes two pairs of opposed spaced guide members for engaging opposed edges of the band and providing stable guidance of the carriage assembly around the pipe and structure for fixedly mounting a cutting tool on the carriage assembly. The cutting tool assembly is secured to the carriage assembly for movement relative to the pipe, preferably about a pivot axis parallel to the axis of the pipe, and includes a drive motor, a manual motor control, and a cutter disc coupled to the drive motor and adapted to be driven in rotation by the drive motor in response to the manual motor control.

20 Claims, 2 Drawing Sheets

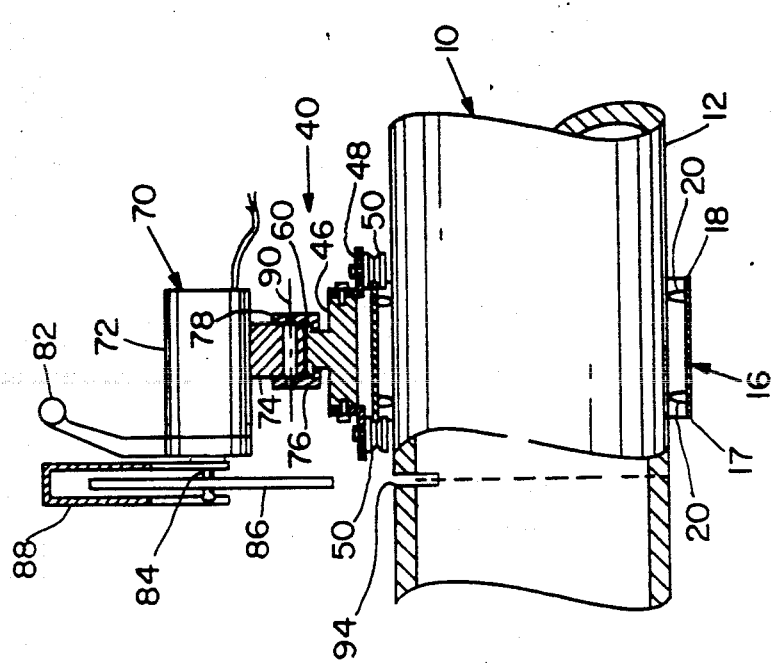
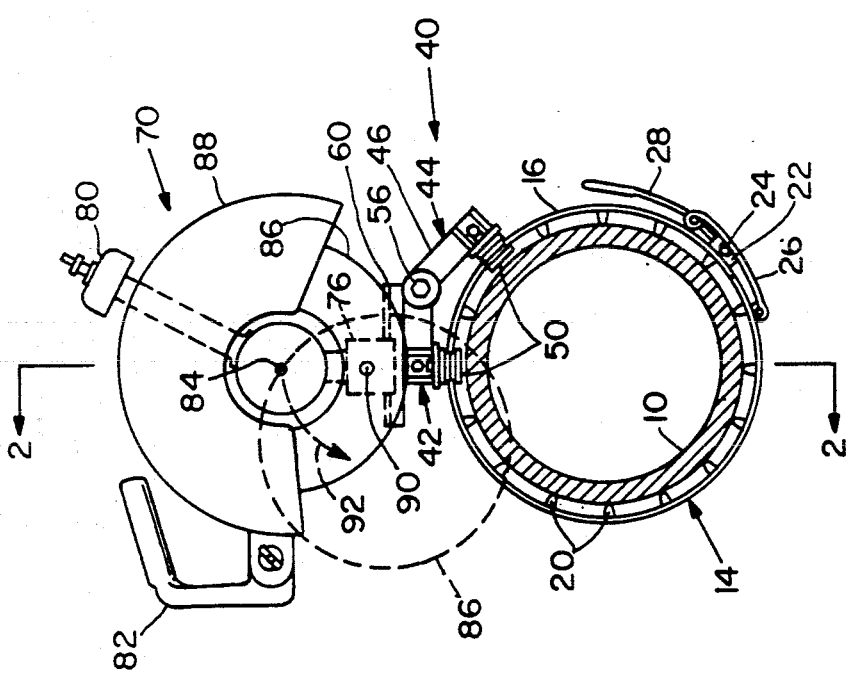
Fig. 2
Fig. 1

PIPE CUTTING

BACKGROUND OF THE INVENTION

This invention relates to pipe cutting, and more particularly to a system particularly adapting to cutting large diameter pipe.

It is frequently desirable to cut large diameter heavy duty pipe for repair or replacement of sections of a pipe or components connected to the pipe. Such large diameter pipe is typically twenty-five centimeters and more in diameter and may be of larger diameter such as thirty centimeters diameter, forty centimeters diameter, and more. Such large diameter pipes frequently have wall thicknesses of one centimeter or more, and the cutting of a section of such pipe is an arduous task. For example, cutting of a ninety centimeter outer diameter steam line that has a five centimeter wall thickness may take several days using conventional technology.

In accordance with one aspect of the invention, there is provided a pipe cutting system that includes an annular pipe encircling band member with parallel edge surfaces for encircling the pipe to be cut, releasable structure for securing the band member in pipe encircling configuration, and structure for spacing the edge surfaces of the band from the outer surface of the pipe. A carriage assembly includes two pairs of opposed spaced guide members for engaging opposed edges of the band and providing stable guidance of the carriage assembly around the pipe and structure for fixedly mounting a cutting tool on the carriage assembly. The cutting tool assembly is secured to the carriage assembly for movement relative to the pipe, preferably about a pivot axis parallel to the axis of the pipe, and includes a drive motor, a manual motor control, and a cutter disc coupled to the drive motor and adapted to be driven in rotation by the drive motor in response to the manual motor control.

Preferably, the band member in a flexible metal strip with parallel guide surfaces at its opposed edges that extend along its length, the spacer structure spaces the track strip edges at least about two millimeters from the outer surface of the pipe, and each guide member is a rotatable wheel with a groove that engages a corresponding one of the guide edges of the band member.

In a particular embodiment, the carriage assembly includes two subassemblies coupled together in articulated relation, structure for fixing the subassemblies in a particular angularly offset relation corresponding to the diameter of the pipe to be cut, and each subassembly includes a body portion and a pair of spaced depending bracket members, each of which carries a grooved guide wheel. The cutter disc has a diameter of at least twenty centimeters and the drive motor rotates the cutter disc at a speed of at least three thousand rpm.

The system allows more rapid and more accurate cutting of pipe end surfaces than prior art pipe cutting technology with little or no heat affected zone (HAZ).

Other features and advantages of the invention will be seen as the following description of a particular embodiment progresses, in conjunction with the drawings, in which:

FIG. 1 is an end view of a pipe cutting system in accordance with the invention;

FIG. 2 is a sectional view of the pipe cutting system taken along the line 2—2 of FIG. 1;

DESCRIPTION OF PARTICULAR EMBODIMENT

Figure 3:
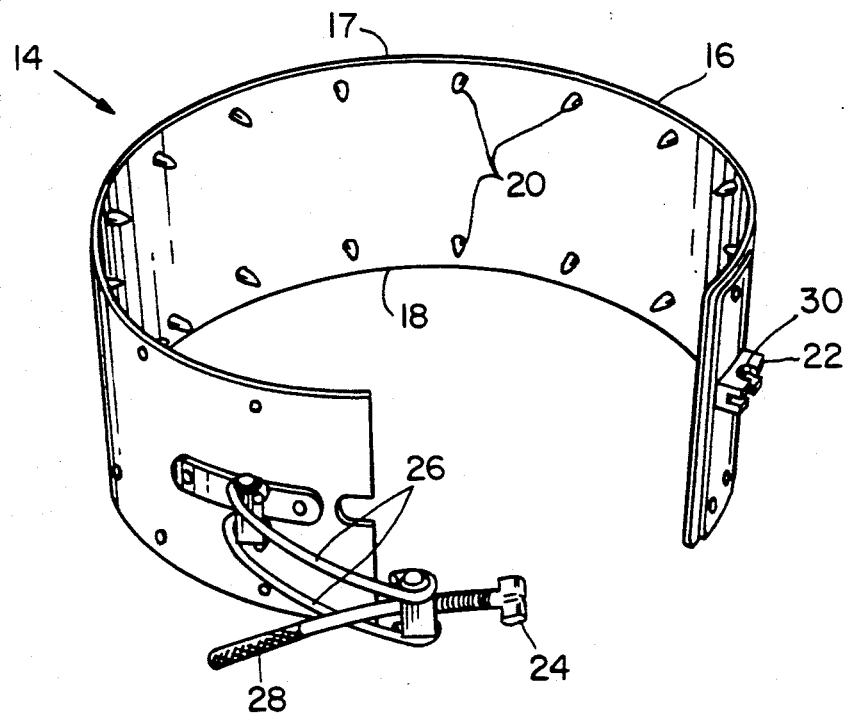
FIG. 3 is a perspective view of the track assembly employed in the system of FIG. 1.

Shown in FIGS. 1 and 2 is pipe 10 that has an outer diameter of thirty centimeters and a wall thickness of two centimeters. Mounted on pipe 10 is track assembly 14 further details of which may be seen with reference to FIG. 3. Assembly 14 includes flexible stainless steel strip 16 that has a width of about fifteen centimeters with parallel opposed edges 17, 18 and is about three millimeters thick. Spaced along each edge of strip 16 are a series of spacer projections 20. A toggle clamp assembly includes latch member 22 secured at one end of strip 16 and coupling head 24 that is pivotally carried on arms 26 and actuated by handle 28 for engaging recess 30 in member 22 to lock track assembly 14 on pipe 10 with edges 17, 18 extending around pipe 10 and the ends of strip 16 in alignment and in close juxtaposition.

Figure 4:
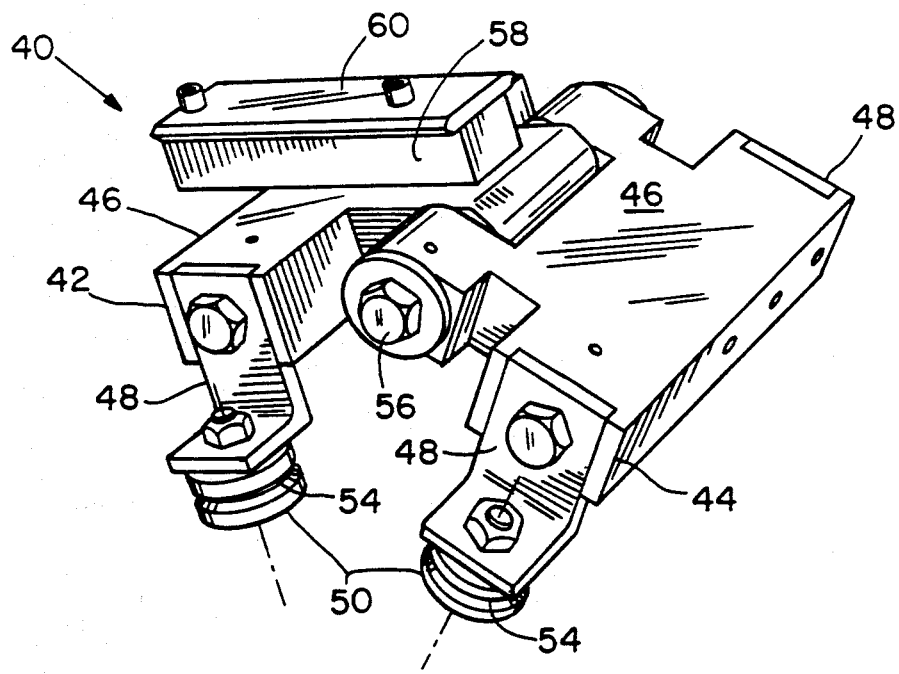
FIG. 4 is a perspective view of the carriage assembly employed in the system of FIG. 1.

Cooperating with track assembly 14 is articulated carriage assembly 40, further details of which may be seen with reference to FIG. 4. Carriage assembly 40 includes bracket assemblies 42, 44, each of which includes body member 46 and two depending extensions 48 with a guide wheel 50 that is rotatable about axis 52 and has a V groove 54 for engaging a respective edge 17, 18 of band strip 16. Bracket assemblies 42, 44 are connected together by pivot bolt 56 which allows the bracket assemblies to conform to the diameter of the pipe 10 on which band strip 16 is clamped. Mounted on body member 46 is transverse block 58 that carries mounting plate 60.

Cutting tool assembly 70 includes motor housing 72 with main pivot bracket 74 that carries clamp members 76, 78 for securing cutting tool assembly 70 on mounting plate 60. Also secured to motor housing 72 are upstanding handle assembly 80 and forwardly projecting handle assembly 82. Extending outwardly from housing 72 is drive shaft 84 on which twenty-five centimeter diameter abrasive cutter disc 86 is mounted in protective housing 88. The drive motor 72 may be of any suitable type such as electric or pneumatic with a suitable control such as a relief valve system for limiting the rotational speed of the cutter disc 86.

In system use, band 16 is disposed on the outer surface 12 of the pipe 10 to be cut and secured in place with toggle clamp assembly so that spacer projections 20 are seated on the outer surface 12 of pipe 10 and strip edges 17, 18 are spaced about one centimeter from the outer surface of pipe 10. The articulated carriage assembly is then mounted on track 16 with the V-groove 54 of each guide wheel 50 disposed in engagement with edges 17, 18 of track 16. Extensions 48 are constrained to extend generally perpendicularly from track 16 and each body member 46 is essentially parallel to a tangent to the track 16 at the point where the guide wheels 50 engage that track strip. The two body members 46 are disposed at an angle to one another as accommodated by pivot joint 56 to provide a stable carriage platform that moves freely around the outer surface of the pipe 10. Pivot joint 56 preferably is tightened to further stabilize the carriage assembly 40. The edges 17, 18 of track strip 16 are spaced a predetermined distance (about one centimeter) from the desired cut 94 and provide a stable guide for the annular cutting action.

Cutting tool assembly 70 is fixed in place on mounting plate 60 by clamp members 76, 78. Tool 70 is pivotable about main axis 90 defined by pivot bracket 74 that extends parallel to the axis of drive shaft 84 so that the cutting disc 86 may be moved in an arc 92 about axis 90 for cutting through the wall of pipe 10 and the cutting tool assembly 70 may be moved completely about the pipe 10 for providing an accurate aligned cut surface 94 of pipe 10.

In use, as indicated in FIGS. 1 and 2, an operator energizes the drive motor 72 to rotate the cutter disc 86 at a speed of about 5,200 rpm. With handle assemblies 80 and 82, the operator rotates the tool 70 in pivoting action about axis 90 to move the cutter disc 86 into cutting action with pipe 10 and in annular movement along track 16 to provide an annular aligned cut 94 through the pipe. In use of a system in accordance with the invention, a ninety centimeter outer diameter steel steam line that has a wall thickness of five centimeters was cut in two places to remove a valve in seven hours, in contrast with prior reciprocating saw or torch technology in which seventy-two hours was allowed for removal of the valve.

While a particular embodiment of the invention has been shown and described, various modifications will be apparent to those skilled in the art, and therefore, it is not intended that the invention be limited to the disclosed embodiment or to details thereof, and departures may be made therefrom within the spirit and scope of the invention.

What is claimed is:

1. A pipe cutting system comprising
annular pipe encircling track structure, said track structure including a flexible strip member with two parallel edges for encircling the pipe to be cut, structure for securing said strip member in pipe encircling configuration, and structure for spacing the edge surfaces of said strip member from the outer surface of said pipe;
a carriage assembly including two pairs of spaced guide structures for engaging the edges of said strip member in guiding relationship such that each said guide structure is disposed generally perpendicular to a tangent to the track strip at the point of engagement of said guide structures for movement of said carriage assembly along said track structure completely around the pipe; and
a cutting tool assembly for mounting on said carriage assembly, said cutting tool assembly including a drive motor, a drive shaft coupled to said drive motor and a cutter disc mounted on said drive shaft for rotation about a drive axis extending generally perpendicular to the axis of said pipe, and structure for coupling said cutting tool assembly to said carriage assembly to allow movement of said cutting tool assembly relative to said pipe so that said cutting tool assembly may be moved to place said cutter disc in cutting relation with the pipe and said cutting tool assembly and said carriage assembly may be concurrently moved along said track strip around said pipe to cut through the annular wall of said pipe.

2. The system of claim 1 wherein said flexible track strip member is of metal and has a width of at least about ten centimeters and said spacer structure includes an array of spacer projections adjacent each edge of said strip for spacing said track strip at least about five millimeters from the outer surface of the pipe.

3. The system of claim 1 wherein said securing structure includes toggle clamp structure with a latch member secured adjacent one end of said track strip and coupling head structure carried adjacent the other end of said track strip for engaging said latch member to clamp said track strip on said pipe in encircling relation.

4. The system of claim 1 wherein said carriage assembly includes a pair of bracket subassemblies, and structure coupling said bracket subassemblies together, each said bracket subassembly including a body portion and a pair of said spaced guide structures.

5. The system of claim 4 and further including structure for fixing said body portions in angularly offset relation corresponding to the diameter of the pipe to be cut.

6. The system of claim 4 wherein said two body portions are pivotally connected together along a pivot axis that extends transversely to the track direction, and each said guide structure includes a grooved guide wheel for engaging an edge of said strip member.

7. The system of claim 1 wherein said drive motor is adapted to rotate said cutter disc at a speed of at least three thousand rpm.

8. The system of claim 1 wherein said cutter disc has a diameter of at least twenty centimeters.

9. The system of claim 1 wherein said cutting tool assembly coupling structure allows movement of said cutting tool assembly relative to said pipe about a pivot axis parallel to the axis of said pipe.

10. The system of claim 1 wherein said carriage assembly includes two bracket subassemblies that are pivotally connected together along a pivot axis that extends transversely to the track direction.

11. The system of claim 1 wherein each said guide structure includes a rotatable grooved guide wheel for engaging an edge of said strip member.

12. The system of claim 11 wherein said spacer structure is adapted to space said track strip at least about five millimeters from the outer surface of the pipe.

13. The system of claim 12 wherein said cutter disc has a diameter of at least twenty centimeters and said drive motor is adapted to rotate said cutter disc at a speed of at least three thousand rpm.

14. The system of claim 13 wherein said carriage assembly includes a pair of bracket subassemblies, and structure coupling said bracket subassemblies together, each said bracket subassembly including a body portion and a pair of said spaced guide structures.

15. The system of claim 14 and further including structure for fixing said subassemblies in angularly offset relation corresponding to the diameter of the pipe to be cut.

16. The system of claim 15 wherein said cutting tool assembly coupling structure allows movement of said cutting tool assembly relative to said pipe about a pivot axis parallel to the axis of said pipe.

17. The system of claim 16 wherein said securing structure includes toggle clamp structure with a latch member secured adjacent one end of said track strip and coupling head structure carried adjacent the other end of said track strip for engaging said latch member to clamp said track strip on said pipe in encircling relation.

18. A pipe cutting system comprising
annular pipe encircling track structure, said track structure including a flexible strip member with two parallel edges for encircling the pipe to be cut, structure for securing said strip member in pipe encircling configuration, and structure for spacing the edge surfaces of said strip member from the outer surface of said pipe;

a carriage assembly including two pairs of spaced guide structures for engaging the edges of said strip member in guiding relationship such that each said guide structure is disposed generally perpendicular to a tangent to the track strip at the point of engagement of said guide structures for movement of said carriage assembly along said track structure completely around the pipe, said carriage assembly including a pair of bracket subassemblies, each said bracket subassembly including a body portion and a pair of said spaced guide structures, each said guide structure including a grooved guide wheel for engaging an edge of said strip member, and structure for adjustably pivotally connecting said two body portions together along a pivot axis that extends transversely to the track direction including structure for fixing said body portions in angularly offset relation corresponding to the diameter of the pipe to be cut; and a cutting tool assembly for mounting on said carriage assembly, and structure for coupling said cutting tool assembly to said carriage assembly to allow movement of said cutting tool assembly relation to said pipe so that said cutting tool assembly and said carriage assembly may be concurrently moved along said track strip around said pipe to cut the annular wall of said pipe.

19. The system of claim 18 wherein said cutting tool assembly coupling structure allows movement of said cutting tool assembly relative to said pipe about a pivot axis parallel to the axis of said pipe.

20. The system of claim 19 wherein said flexible track strip member is of metal and has a width of at least about ten centimeters and said spacer structure includes an array of spacer projections adjacent each edge of said strip for spacing said track strip at least about five millimeters from the outer surface of the pipe.

* * * * *